United States Patent

Yazaki et al.

[11] Patent Number: 6,032,055
[45] Date of Patent: Feb. 29, 2000

[54] METHOD OF ACTIVATION OF MOBILE STATION

[75] Inventors: Hidetoshi Yazaki; Kouji Chiba, both of Yokohama; Isao Hirakodama, Yokosuka; Norihito Tokuhiro, Yokohama, all of Japan

[73] Assignee: NTT Mobile Communications Network, Inc, Tokyo, Japan

[21] Appl. No.: 09/068,499

[22] PCT Filed: Sep. 18, 1997

[86] PCT No.: PCT/JP97/03302

§ 371 Date: May 12, 1998

§ 102(e) Date: May 12, 1998

[87] PCT Pub. No.: WO98/12894

PCT Pub. Date: Mar. 26, 1998

[30] Foreign Application Priority Data

Sep. 19, 1996 [JP] Japan .................................. 8-248117

[51] Int. Cl.⁷ ........................................ H04Q 7/20
[52] U.S. Cl. ......................... 455/558; 455/575; 455/38.3
[58] Field of Search .................................. 455/410, 411, 455/418, 419, 551, 558, 552, 553, 461, 405, 406, 407, 575, 38.3

[56] References Cited

U.S. PATENT DOCUMENTS

| | | | |
|---|---|---|---|
| 5,266,782 | 11/1993 | Alanara et al. | 379/91 |
| 5,353,328 | 10/1994 | Jokimies | 455/558 |
| 5,448,765 | 9/1995 | Kovanen et al. | 455/558 X |
| 5,675,628 | 10/1997 | Hokkanen | 379/58 |
| 5,715,522 | 2/1998 | Vimpari et al. | 455/88 |
| 5,854,976 | 12/1998 | Garcia Aguilera et al. | 455/411 |

*Primary Examiner*—Wellington Chin
*Assistant Examiner*—Yemane Woldetatios
*Attorney, Agent, or Firm*—Pollock, Vande Sande & Amernick

[57] ABSTRACT

When a power supply to a mobile station is turned on, mobile station identification information is read out from a non-volatile storage of a subscriber information module. A module identification information is read out from the non-volatile storage of the mobile station. The mobile station identification information which is read out is collated against the own mobile station identification information, and module identification information which is read out is collated against identification information for the loaded subscriber information module. If the module identification information does not coincide, the communication processing information is read out from the loaded subscriber information module and is stored into the non-volatile storage of the mobile station to update its content. Identification information for subscriber information module is stored into the non-volatile storage of the mobile station to update it. Identification information for the mobile station is stored into the non-volatile storage of the subscriber information module to update it. Subsequently, communication processing information stored in the non-volatile storage of the mobile station is read out to set up a condition which enables a communication. When the collation indicates a "coincidence", communication processing information which is previously stored in the non-volatile storage of the mobile station is read out to set up a condition which enables a communication.

10 Claims, 5 Drawing Sheets

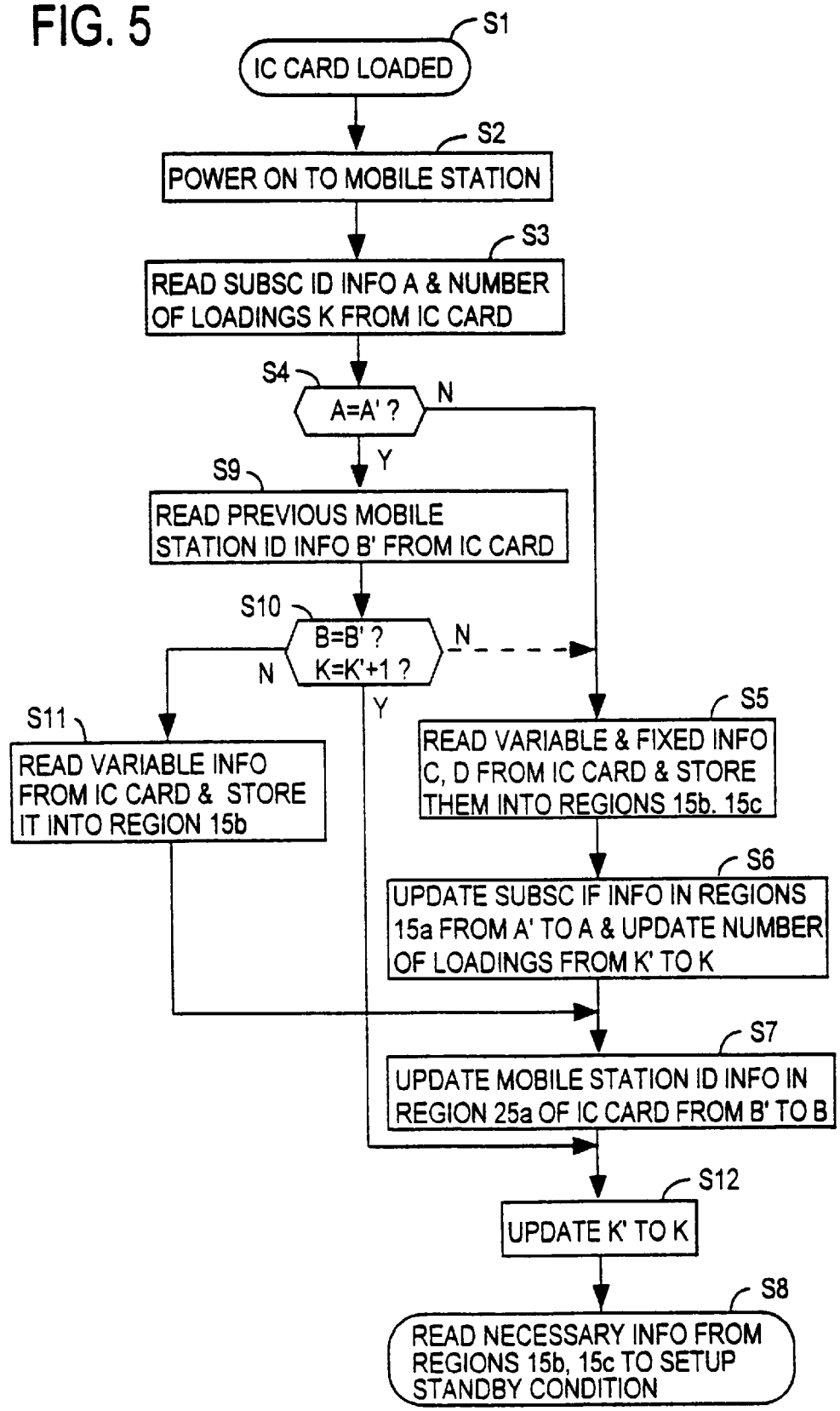

METHOD OF ACTIVATION OF MOBILE STATION

FIELD OF THE INVENTION

The invention relates to a method of invoking a mobile station such as a land mobile radiotelephone station or a portable telephone set used in mobile communication in which a subscriber information module (such as an IC card, for example,)storing a subscriber identification information, a network information and a subscriber set-up information (hereafter collectively referred to as subscriber information required for processing a communication and abbreviated as communication processing information) is detachably mounted or loaded in the station and each time the power supply for the station is turned on, the communication processing information is read out from the module in order to enable a communication with a base station.

A subscriber information module in which information required to utilize a mobile station is stored comprises an IC card, for example, which stores subscriber identification information, network information, subscriber set-up information, etc., that is, information used in the processing of communications. The subscriber identification information is, for example, a subscriber number (such as a telephone number or a serial number of the IC card). Network information includes information relating to a location (cell or zone) where a previous location registration is made, information indicating a home network where the subscriber is originally registered and roaming information, etc. The subscriber set-up information includes information relating to services available by the subscriber, abbreviated dial data and memory dial data (which is data representing a list of telephone numbers vs. peer names). Both the network information and the subscriber set-up information include fixed information (such as home network information, roaming information, services information and the like, for example) and variable information (such as registered location information, abbreviated dial data, memory dial data or the like, for example). In addition, each variety of such subscriber information includes a kind of information which is essential to establishing a communication (as may be exemplified by subscriber identification information and network information or the like) and another kind of information which is not always required for a communication, but which affords some convenience to a user (such as abbreviated dial data, memory dial data, and charge and interval transmission).

The subscriber information module is not always loaded in a predetermined mobile station, but may be loaded in any desired mobile station for use. Accordingly, it follows that a mobile station may accept any subscriber module, which is not limited to any one particular module.

Previously, the practice has been that each time the power supply to a mobile station is turned on, that station operates to read out every data which is required for its executable functions from a subscriber information module loaded therein, to save such data in a memory thereof and to select data required for the intended function (such as retrieval of a number or a dialed connection) from the memory to prepare the mobile station for use (or in standby condition).

A mobile station is not only utilized by a user for communication, but a variety of auxiliary functions affording convenience to the communication are also provided. By way of example, a memory dial allows, if a number of telephone numbers and names of corresponding peers within a given number are previously registered, a retrieval of a particular telephone number from its associated peer name at any time and an origination, if required, or a retrieval of peer name from a corresponding telephone number. Data utilized in this manner by the additional functions is personal to a user and is updated (or edited) from time to time by the user. The updating of data takes place by loading the subscriber information module (IC card) into a mobile station by the user.

When a user uses a mobile station for purpose of communication, when a user utilizes a mobile station to obtain information (such as a subscriber number, network information, interval and charge of transmission and the like) or when a user uses a mobile station in order to update the subscriber set-up information (by addition, modification or deletion of a memory dial or an abbreviated dial), every time a module is loaded into the mobile station, the first thing the station has to do is to read all information that may be utilized from the module and to save it in the memory. When the amount of such data is substantial, it takes a corresponding length of time for data read-out from the module. If the subscriber module includes a memory dial for 100 persons or companies as combinations of names and corresponding telephone numbers, the total data quantity of the memory dial would amount to 4 k bytes assuming that 40 bytes, are required per item. It follows that the mobile station reads all such data and saves it in a memory (RAM) to be available at any time whenever the module is loaded. When the quantity of information necessary to process a communication increases in this manner, the data read-out may require an unnecessarily long time.

During an interval of time after a module is loaded into a mobile station and the power supply thereto is turned on until the next time the power supply is turned on, the following situations are possible:

(a) the subscriber information module is left loaded in the mobile station until the latter is used for the next time, thus without being removed from the mobile station;

(b) the module is removed, but is re-loaded, and there occurs no change in the communication processing information;

(c) the initial module is removed, another subscriber information module is loaded, and then the initial module is loaded again; and (d) the subscriber information module in question is either loaded subsequently into another mobile station or loaded into a terminal equipment which allows information in the module to be updated, and is then loaded into the initial original mobile station after a change in the information has occurred.

In each of the cases (a) to (c), a wasteful read-out of the communication processing information is repeated each time the power supply is turned on even though such information in the module remains unchanged, causing an elongation in the time interval from the turn-on to the useable condition and increasing power dissipation of a battery operated mobile station (cellular telephone) to reduce the remaining time available for use.

It is an object of the invention to provide a method of invoking a mobile station which is capable of reducing a length of time from a turn-on to an operable condition of a mobile station, and thus reducing a power dissipation.

SUMMARY OF THE INVENTION

In accordance with the invention, there is provided a method of invoking a mobile station in which a mobile station includes a storage storing its own station identification information and a first non-volatile storage for storing a subscriber identification information which is read from a loaded subscriber information module and a corresponding communication processing information, while a subscriber information module includes a storage storing the subscriber identification information and a second non-volatile storage for holding the mobile station identification information from the mobile station into which the module is loaded; the method comprising the steps of (a) reading the subscriber identification information from the first non-volatile storage of the mobile station and comparing it against the subscriber identification information read from the storage of the loaded module for coincidence;

(b) reading the mobile station identification information from the second non-volatile storage of the loaded module and comparing it against the mobile station identification information read from the storage of the mobile station for coincidence;

(c) setting up a condition which enables a communication using previous communication processing information stored in the first non-volatile storage of the mobile station without performing a read-out of the communication processing information from the second non-volatile storage of the module in the event a condition is satisfied which includes at least that the subscriber identification information coincides at step (a) and that the mobile station identification information coincides at step (b); and (d) in the event the subscriber identification information does not coincide at step (a), (d-1) reading the communication processing information from the second non-volatile storage of the module to update the communication processing information stored in the first non-volatile storage of the mobile station in a manner corresponding to the subscriber identification information;

(d-2) using the subscriber identification information read from the storage of the module to update the subscriber identification information stored in the first non-volatile storage of the mobile station;

(d-3) using the mobile station identification information stored in the storage of the mobile station to update the mobile station identification information stored in the second non-volatile storage of the module and using the updated communication processing information to set up a condition which enables a communication.

In a further embodiment of the method of invoking a mobile station, the communication processing information includes variable information and fixed information, and in the event the subscriber identification information coincides at step (a) while the mobile station identification information does not coincides at step (b), the steps of (e-1) reading variable information from the second non-volatile storage of the module to overwrite variable information stored in the first non-volatile storage; and (e-2) using the mobile station identification information stored in the storage of the mobile station to update the mobile station identification information stored in the second non-volatile storage of the module and using the updated variable information and fixed information previously stored in the first non-volatile storage to set up a condition which enables communication, are carried out.

BRIEF DESCRIPTION OF THE DRAWINGS

FIG. 5 is a flow diagram of another embodiment which includes a collation of a number of loadings.

DETAILED DESCRIPTION OF THE INVENTION

Figure 1:
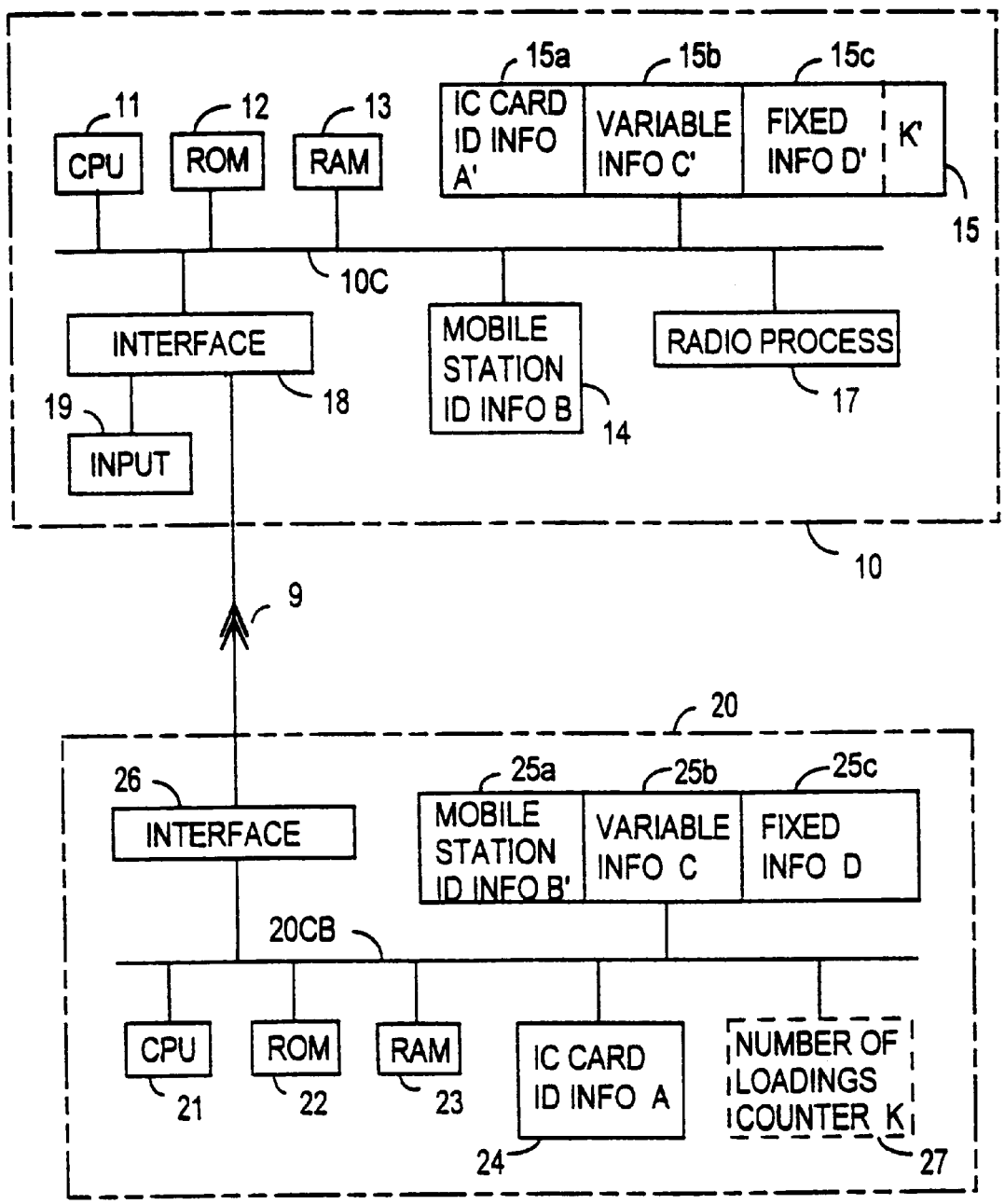
FIG. 1 is a block diagram of a controller of a mobile station and an IC card which are used in carrying out a method according to the invention.
Figure 2:
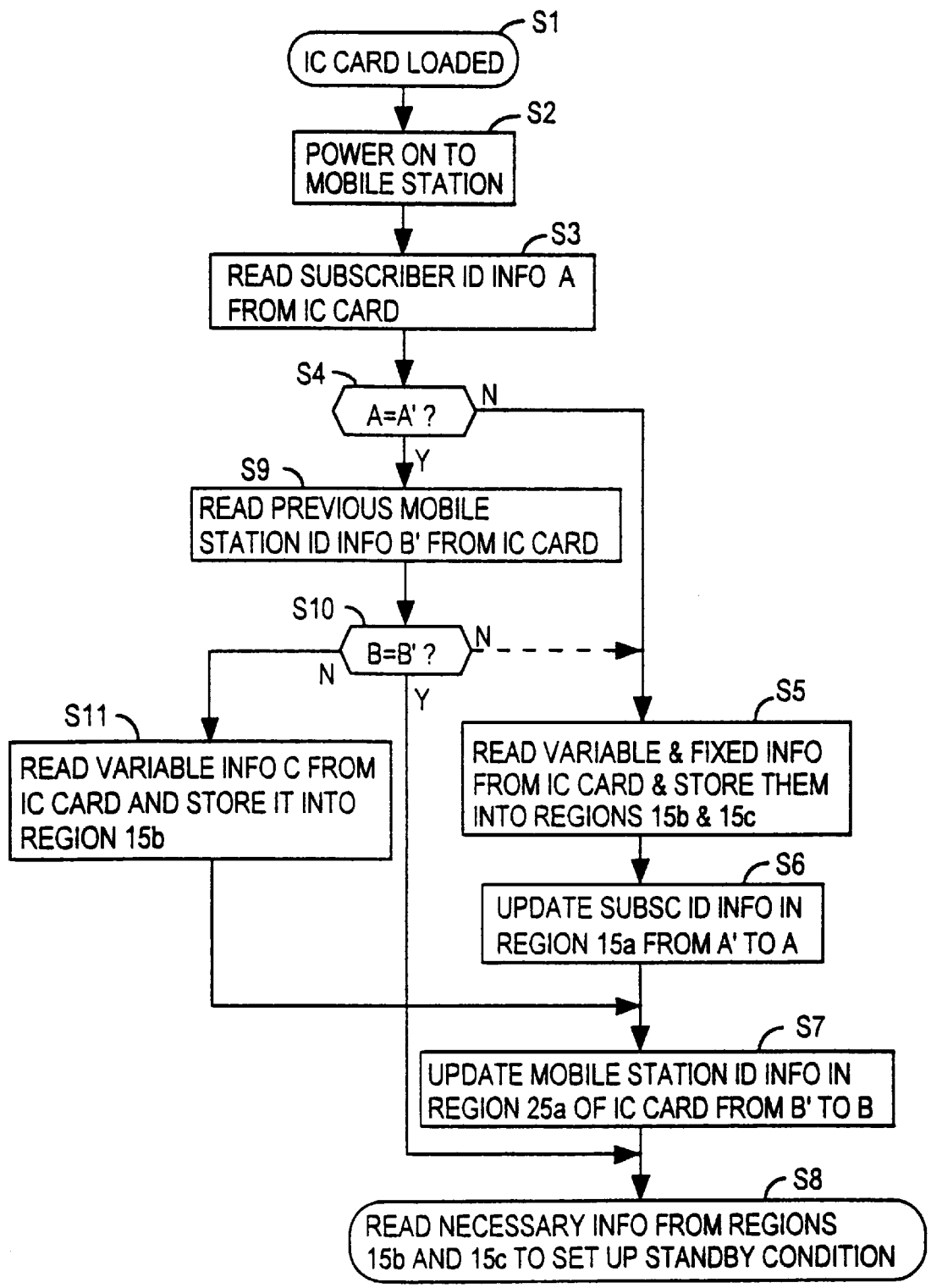
FIG. 2 is a processing flow diagram illustrating a method of invoking a mobile station according to the invention.

FIG. 1 shows the construction of a controller 10 of a mobile station and an IC card 20 used as a subscriber information module which is loaded into the mobile station, both of which are used in the practice of the invention. The controller 10 of the mobile station comprises CPU 11, ROM 12, RAM 13, a storage 14 for mobile station identification information, a storage 15 for subscriber identification information, a clock 16, a radio processor 17 and an interface 18, all of which are connected to a common bus 10CB. A key entry unit 19 is connected to the interface 18, to which a connector 9 is also connected for allowing an IC card, which is inserted into a slot of a mobile station, to be connected. In the controller 10, CPU 11 decodes a program stored in the ROM 12 and executes information processing which is necessary for the mobile station to effect a communication, inclusive of the invoking process according to the invention which is shown in FIG. 2 and to be described later. RAM 23 is used as a working storage when executing the information processing. The radio processor 17 performs a processing operation which is required to transfer data (or signals) between a Codec (coder-decoder) and a modulator-demodulator, not shown. The storage 14 for the mobile station identification information comprises a non-volatile memory or ROM and carries a serial manufacturing number of the mobile station as a mobile station identification information B.

The storage 15 for the subscriber information, which comprises a non-volatile memory, includes a region 15a into which a subscriber number (either a telephone number or a serial IC card number) that is read out from a storage 24 for the subscriber identification information of the IC card 20, which is loaded during a previous pass, is written and stored as subscriber identification information A'. The storage 15 for the subscriber information also includes regions 15b and 15c, which store variable information C and fixed information D which have been stored in regions 25b and 25c of a storage 25 of the IC card that was loaded during a previous pass as variable information C' and fixed information D'. As mentioned previously, the variable information may comprise, for example, registered location information, abbreviated dial data, memory dial data or the like, while fixed information may comprise, for example, home network information, roaming information, services information or the like.

The IC card 20 comprises CPU 21, ROM 22, RAM 23, storage 24 for subscriber identification information (which will be hereafter referred to as a storage for IC card identification information), a non-volatile storage 25 and an interface 26. Also in the IC card 20, CPU 21 decodes a program stored in ROM 22, for example, to read data demanded from a mobile station from storages 24 and 25 to provide it and the mobile station or to write data supplied from a mobile station into the storages 24, 25 at a specified address. RAM 23 serving as a working memory is used during various processing operations as required. The non-volatile storage 25 includes a region 25a which stores the identification information B' of the mobile station into which the IC card is loaded during a previous pass. Regions 25b and 25c of the storage 25 store variable information C and fixed information D, respectively, of predetermined communication processing information which is supplied from the entry unit 19 of the mobile station by the subscriber. The mobile station identification information B (such as a serial manufacturing number of the mobile station or the like or the subscriber identification information A (such as a serial number of the IC card or the like) has a quantity of information on the order of 10 to 20 bytes at most, which is substantially less than the quantity of information contained in the communication processing information C, D. Accordingly, a length of time required to read out identification information B, A is much shorter than the time required to read out the communication processing information C, D, and it is this feature that the invention takes the advantage of Referring to FIG. 2, a method according to one embodiment of the invention will now be described. An IC card 20 is loaded into the mobile station (S1). When the power supply for the mobile station is turned on (S2), a serial number A of the IC card, serving as an identification number for the IC card 20, is read from the storage 24 of the IC card for the identification information and is fed to CPU 11 (S3).

Upon receiving the serial number A, the controller 10 effects a collation between the serial number A read from the IC card 20 and a serial number A' of the IC card which is stored in the region 15a of the subscriber information storage 15 of the mobile station (S4). If the collation at step S4 reveals that the serial numbers do not coincide, a variable information C and a fixed information D are read from the regions 25b and 25c, respectively, of the non-volatile the storage 25 of the IC card 20 at step S5, and the communication processing information C, D which is read is stored in the regions 15b and 15c, respectively, of the subscriber information storage 15, thus rewriting the communication processing information. At step S6, the card serial number A which is previously read from the IC card 20 at step S3 is stored into the region 15a of the subscriber information storage 15, thus updating the stored card serial number A' stored therein. In addition, at step S7, the serial manufacturing number B of the mobile station is stored into the region 25a of the non-volatile storage 25 of the IC card 20, thus updating the manufacturing number B' stored therein. Subsequently, at step S8, when it is necessary, information which is required to establish a communication is read from the communication processing information C', D' stored in the regions 15b, 15c of the subscriber information storage 15, thus setting up a condition which enables communication with a base station.

When the card serial number A and the card serial number A' stored in the region 15a coincide at step S4, the serial number of the mobile station into which the IC card is loaded during a previous pass and serving as mobile station identification information B' is read from the region 25a of the non-volatile storage 25 at step S9. CPU 11 effects a collation between the manufacturing number B, serving as the identification for this mobile station, which is stored in the mobile station identification information storage 14, and the manufacturing number B' read out from the region 25a of the non-volatile storage 25 of the IC card 20 at step S10. If the collation at step S10 reveals that the manufacturing numbers do not coincide, this means that the IC card 20 was loaded into a different mobile station during a previous pass. In this instance, it is possible that variable information C' may be modified. Accordingly, at step S11, variable information C is read from the non-volatile storage region 25b of the IC card to be overwritten into the non-volatile storage region 15b of the mobile station. Subsequently, at step S7, the mobile station identification information B' stored in the non-volatile storage region 25a of the IC card is updated to the information B, and at step S8, necessary information is obtained from the non-volatile regions 15b, 15c to enable a communication. Thus in this instance, fixed information (such as home network information, roaming information, services information or the like) stored in the non-volatile storage region 15c of the mobile station is not updated, and information which is already stored therein is utilized.

When it is found at step S10 that the mobile station manufacturing number B and the mobile station manufacturing number B' stored in the region 25a coincide, the operation proceeds to step S8 where necessary information is derived from the communication processing information C', D' stored in the regions 15b, 15c of the subscriber information storage 15 within the mobile station, thus enabling a communication with a base station. In this instance, no reading operation takes place from the IC card 20 for the communication processing information C, D, but communication processing information C', D' which is already stored in the non-volatile storage regions 15b, 15c is utilized.

Where the card serial number A' or mobile station manufacturing number B' are not stored, they are treated as "non-coincidence" at steps S4 and S10.

In this manner, in accordance with the invention, when the IC card is loaded into a mobile station, a comparison is made between the IC card identification number A read from the storage 24 of the IC card and the IC card identification number A' which is previously written into the region 15a of the subscriber information storage 15 of the mobile station. Also, a comparison is made between the mobile station identification number B stored in the identification information storage 14 of the mobile station and the mobile station identification number B' which is written into the region 25a of the non-volatile storage 25 of the IC card. When the indicated numbers coincide in both instances, this means that the IC card which is loaded is the same as one which is loaded into that mobile station during a previous pass. In addition, a decision is rendered that the communication processing information C', D' already stored in the non-volatile storage regions 15b, 15c is identical to the communication processing information C, D which is stored in the non-volatile storage regions 25b, 25c of the IC card. Accordingly, no reading operation takes place from the storage regions 25b, 25c of the IC card, and a time interval until the commencement of a communication can be reduced by utilizing the communication processing information C', D' which is stored in the storage regions 15b, 15c of the mobile station.

In the event the collation between the identification information A and A' at step S4 indicates a "coincidence" while the collation between the identification information B and B' at step S10 indicates a "non-coincidence", it is possible that the IC card is once used in another mobile station and variable information C may have been modified, but fixed information D remains unchanged. Accordingly, in such instances, there is no need of copying fixed information D from the non-volatile storage region 25c of the IC card to the non-volatile storage region 15c of the mobile station, only a copying of variable information from the non-volatile region 25b to 15b as needed. In this manner, a length of time required for read-out can be reduced as compared with a reading of the entire communication processing information C, D.

In the invoking procedure of the mobile station shown in FIG. 2, if the collation at the step S10 indicates a "non-coincidence", an alternative path may be chosen to step S5 followed by steps S6, S7 and S8, as indicated by broken lines.

In the described embodiment, a reduction in the length of time until an operable condition (a condition which allows a commencement of a communication) is established in the mobile station is possible only when a user or a subscriber who used a mobile station during a previous pass is the same as the user who uses that mobile station now, using the same IC card. This means that if the user of the current pass is the same as the user of the second previous pass and if there is no change in the content of the IC card of that user, there is a need for the mobile station to read variable information C from the IC card. An improvement can be made in this respect, and a second embodiment in which identification numbers of a plurality of users who recently used a particular mobile station and corresponding communication processing information are stored in the non-volatile storage 15 of that mobile station will now be described with reference to FIGS. 3 and 4.

Figure 3:
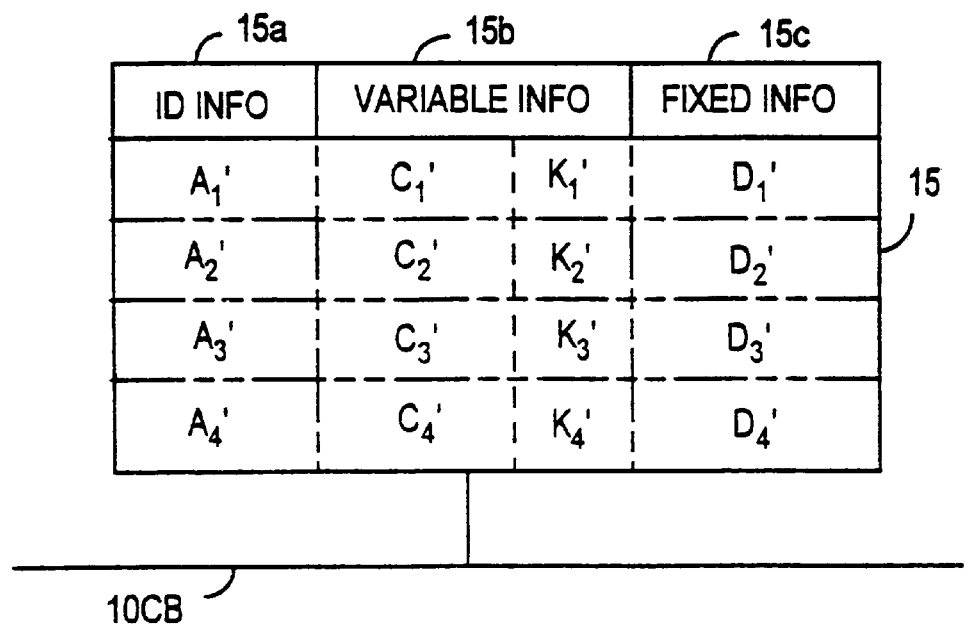
FIG. 3 is a diagram showing the arrangement of regions in a non-volatile storage which is contained in a controller of a mobile station in a modification of the embodiment of the invention.

The second embodiment differs from over the first embodiment in the arrangement of a region in the non-volatile storage 15 of the controller 10 in the mobile station shown in FIG. 1. The resulting arrangement of the storage region is shown in FIG. 3. In the second embodiment, the regions 15a, 15b of the non-volatile storage 15 connected to the common bus 10CB within the controller of the mobile station are arranged to be capable of storing identification numbers $A_1'$ to $A_4'$ of up to four different recent users and corresponding communication processing information $C_1'$ to $C_4'$, $D_1'$ to $D_4'$ in the time sequence of use. In other respects, the arrangement within the controller 10 remains the same as shown in FIG. 1.

Figure 4:
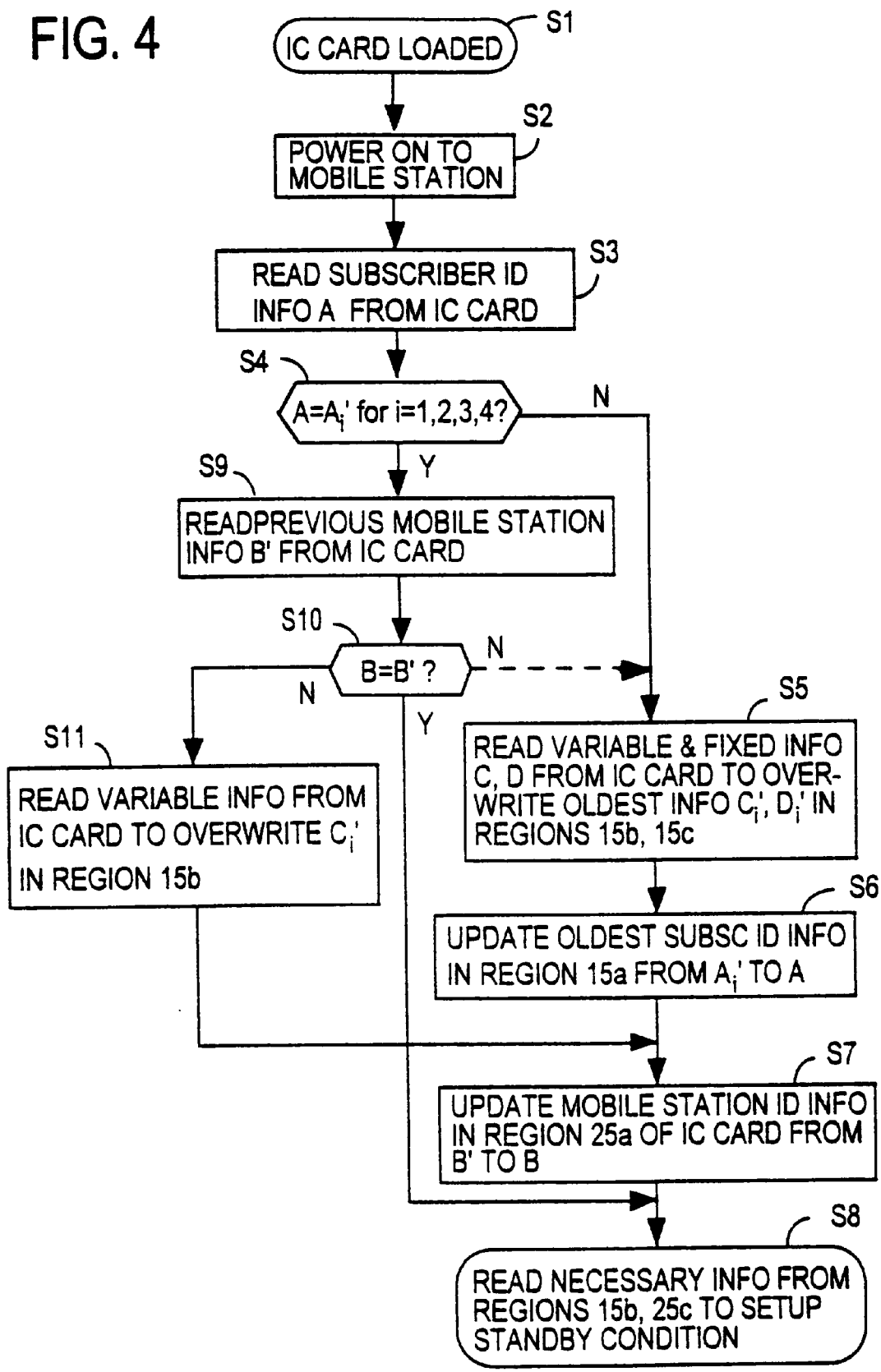
FIG. 4 is a processing flow diagram illustrating the modification.

A flow chart of the invoking procedure for the mobile station according to the second embodiment from its turn-on to its operable condition (a condition enabling a communication) is shown in FIG. 4. An IC card 20 is loaded into mobile station (S1) and a power supply to the power station is turned on (S2), whereupon an IC card serial number A, serving as an identification number for the IC card 20, is read from an identification information storage 24 of the IC card to be written into CPU 21 (S3).

At step S4, the controller 10 sequentially effects a collation between the serial number A read from the IC card 20 and each of serial numbers $A_1'$ to $A_4'$ of IC cards stored in the region 15a of the subscriber information storage 15 of the mobile station. If there were none among the serial numbers $A_1'$ to $A_4'$ which coincide with the serial number A, the communication processing information C, D is read from the regions 25b, 25c of the non-volatile storage 25 of the IC card 20, and is used to overwrite communication processing information $C_4'$, $D_4'$ of the identification number $A_4'$ for the oldest user stored in the regions 15b, 15c of the subscriber information storage 15 to update it at step S5. At step S6, the card serial number A, which is read from the IC card 20 at step S3, is written over the IC card serial number $A_4'$ of the oldest user in the region 15a of the subscriber information storage 15. Subsequently, at step S7, the manufacturing number B of the mobile station is stored in the region 25a of the non-volatile storage 25 of the IC card 20, thus updating the manufacturing number B' which has been stored therein. Subsequently, at step S8, information which is necessary to establish a communication is read from the communication processing information C, D which is now written into the regions 15b, 15c of the subscriber information storage 15, thus enabling a communication with a base station.

If the card serial number A coincides with one of the card serial numbers $A_1'$ to $A_4'$ stored in the region 15 at step S4, the mobile station manufacturing number for the mobile station into which that IC card was loaded during a previous pass, and thus serving as identification information B' for this mobile station, is read from the region 25a of the non-volatile storage 25 at step S9. At step S10, a collation is effected between the manufacturing number B, serving as the identification number for this mobile station which is stored in the mobile station identification information storage 14, and the manufacturing number B' which is read from the region 25a of the non-volatile storage 25 of the IC card. If it is found during collation at step S10 that the mobile station manufacturing number B coincides with the mobile station manufacturing number B' from the region 25a, the operation proceeds to step S8 where a portion of communication processing information $C_1'$ to $C_4'$, $D_1'$ to $D_4'$ which is already stored in the regions 15b, 15c of the subscriber information storage 15 in the mobile station and which corresponds to the comparing serial number $A_i'$ is read out, thus enabling a communication with a base station. Thus, in this instance, a reading of communication processing information from the IC card 20 does not take place.

If the collation of the identification numbers B and B' fails at step S10, this means that IC card has been used in another mobile station during a previous pass, and hence it is possible that variable information C contained in the communication processing information may have been modified. Accordingly, at step S11, variable information C is read from non-volatile storage region 25b of the IC card, and is overwritten on variable information $C_i'$ corresponding to the comparing identification number $A_i'$ stored in the non-volatile storage region 15b of the mobile station, whereupon the operation transfers to step S7 where the mobile station identification information B' in the non-volatile storage region 25a of the IC card is updated to B, followed by step S8 where necessary information is derived from the non-volatile storage region 15b, 15c to enable a communication. Thus, in this instance, fixed information $D_i'$ in the non-volatile storage region 15c of the mobile station is not updated, but use is made of information which is maintained in the non-volatile storage region.

Also in the embodiment of FIG. 4, if the mobile station identification numbers B and B' do not coincide at step S10, the operation may proceed to step S5 and execute subsequent steps S6 to S8, as indicated by broken lines.

With reference to the embodiments shown in FIGS. 2 and 4, the collations between the identification information A and B which take place at steps S4 and S10 have been described as detecting a coincidence between the IC card serial numbers A, A' and a coincidence between the mobile station manufacturing numbers B, B' as an example, because such collation can be a basis for a coincidence between communication processing information C, D in the IC card and communication processing information C', D' which is stored in the non-volatile storage region of the mobile station. However, in the event a mobile station of conventional type is also used in a mobile communication system, if an IC card is used by loading it into a mobile station according to the invention and the same card is subsequently used by loading it into the mobile station of a conventional type, the mobile station identification number B' maintained in the non-volatile storage region 25a of the IC card can not be updated and remains unchanged since a mobile station of a conventional type has no capability to write the mobile station identification number into an IC card. On the other hand, a mobile station of a conventional type is capable of updating variable information (such as registered location information, memory dial data, abbreviated dial data or the like). Thus, there arises the possibility that variable information C stored in the non-volatile storage region 25b of the IC card may have been updated. If this occurs, when the same IC card is loaded into the mobile station according to the invention, which has been used by this IC card during a previous pass, the requirements B=B' and A=A' will be satisfied. Accordingly, the step S8 will be executed using old communication processing information C', D' stored in the non-volatile storage region 15b of the mobile station, without reading communication processing information, C, D in the IC card which may have been updated.

An embodiment which is improved to avoid such possibility is shown in FIG. 5. In this instance, a number of loadings counter 27 is provided within the IC card 20, as indicated in broken lines in FIG. 1, and the counter 27 is incremented by one each time the IC card 20 is loaded into the mobile station 10 and a power supply from the mobile station 10 to the IC card 20 takes place. Since the fundamental procedure remains similar to that shown in FIG. 2, only major distinctions will be described briefly.

Each time the IC card 20 is loaded, the mobile station 10 reads the IC card identification number A from the storage 24 and also reads a count K from the counter 27 of the IC card at step S3 in FIG. 5. A collation between the identification numbers A and A' takes place at step S4. When the collation between the IC card identification numbers A and A' reveals a "coincidence", the operation proceeds to step S9 where the mobile station identification number B' is read from the IC card. A collation between the mobile station identification numbers B and B' takes place at next step S10, and at the same time, the previous count K' which is stored in the non-volatile storage region 15a, for example, of the mobile station in a manner corresponding to the identification number A' of the IC card is incremented by one, and a collation between K and K'+1 takes place. If B≠B' and K≠K'+1, this means that the IC card was loaded during a previous pass in another mobile station according to the invention, and thus there is the possibility that the variable information C may have been modified. If B=B' and K≠K'+1, this means that the IC card was loaded into this mobile station (the mobile station according to the invention) two passes before, but was loaded into a mobile station of a conventional type during a previous pass. Accordingly there is a possibility that variable information C may have been modified. Therefore, in each of these two instances, the operation proceeds from steps S11 and S7 to step S12. If B=B' and K=K'+1 at step S10, the IC card was loaded into this mobile station during a previous pass, and in this instance the count K' is updated to K at step S12. Where the subscriber identification numbers A and A' do not coincide at step S4, the operation proceeds through steps S5, S6 and S7, followed by the execution of step S12. In other respects, the operation remains similar to that mentioned above in connection with FIG. 2.

As an alternative, when the collation for either mobile station identification number B or the number of loadings K results in a "non-coincidence" at step S10 in FIG. 5, steps S5, S6, S7, S12 and S8 may be executed in the similar manner as shown in FIG. 2.

When the number of loadings counter 27 is provided in the IC card, the count of loadings can be incremented if the IC card according to the invention is loaded into the mobile station of a conventional type. Accordingly, when the IC card is subsequently loaded into the mobile station according to the invention, in which it was previously used, the collation between the counts K and K'+1 at step S10 results in a "non-coincidence", thus proceeding to the execution of a reading of at least variable information C which may have been updated from the IC card.

The collation of the number of loadings K in the manner illustrated in FIG. 5 may be applied to the embodiment of FIG. 4 in the similar manner as it is applied to the embodiment of FIG. 2. In this instance, a number of loadings $K_i'$ which is read out from the IC card in a manner corresponding to each subscriber identification number $A_i$ is stored in the non-volatile storage region, as illustrated by a delineation shown in broken lines in FIG. 3.

As described above, in accordance with the invention, each time the power supply is turned on, a collation between the mobile station identification information B' stored in the subscriber information module and the mobile station identification information B, as well as a collation between the module identification information A' stored in the mobile station and the module identification information A stored in the module take place. When the both collations indicate "coincidence", a reading of communication processing information from the subscriber information module and its copying to the mobile station do not take place, but necessary information is read from the communication processing information which is stored in the mobile station. In this manner, a length of time required until a condition which enables a communication is reduced. Also, a reduction in the amount of data transfer from the subscriber information module to the mobile station is effective to reduce the power dissipation.

What is claimed is:

1. A method of invoking a mobile station in which a subscriber information module storing a subscriber information is loaded detachably in a mobile station and each time a power supply to the mobile station is turned on, the subscriber information necessary to process a communication is read out from the module to set up a condition which enables a communication, the mobile station including a storage storing its own station identification information and a first non-volatile storage for storing a subscriber identification information which is read from the loaded subscriber information module and a corresponding communication processing information, the subscriber information module including a storage storing the subscriber identification information and a second non-volatile storage for holding the mobile station identification information from the mobile station into which the module is loaded; the method comprising the steps of (a) reading the subscriber identification information from the first non-volatile storage of the mobile station and comparing it against the subscriber identification information read from the storage of the loaded module for coincidence;

(b) reading the mobile station identification information from the second non-volatile storage of the loaded module and comparing it against the mobile station identification information read from the storage of the mobile station for coincidence;

(c) setting up a condition which enables a communication using the communication processing information previously stored in the first non-volatile storage of the mobile station without performing a read-out of the communication processing information from the second non-volatile storage of the module in the event a condition is satisfied which includes at least that the subscriber identification information coincides at step (a) and that the mobile station identification information coincides at step (b); and (d) in the event the subscriber identification information does not coincide at step (a), (d-1) reading the communication processing information from the second non-volatile storage of the module to update the communication processing information stored in the first non-volatile storage of the mobile station in a manner corresponding to the subscriber identification information;

(d-2) using the subscriber identification information read from the storage of the module to update the subscriber identification information stored in the first non-volatile storage of the mobile station;

(d-3) using the mobile station identification information stored in the storage of the mobile station to update the mobile station identification information stored in the second non-volatile storage of the module and using the updated communication establishing information to set up a condition which enables a communication.

2. A method of invoking a mobile station according to claim 1 in which the communication processing information includes variable information and fixed information, and in the event the subscriber identification information coincides at step (a) while the mobile station identification information does not coincide at step (b), the method further comprising the steps of (e-1) reading the variable information from the second non-volatile storage of the module to be overwritten on the variable information in the first non-volatile storage;

and (e-2) using the mobile station identification information stored in the storage of the mobile station to update the mobile station identification information in the second non-volatile storage of the module and using the updated variable information in the first non-volatile storage and fixed information which is maintained therein to set up a condition which enables a communication.

3. A method of invoking a mobile station according to claim 1 in which in the event the subscriber identification information coincides at step (a) while the mobile station identification information do not coincide at step (b), the steps (d-1), (d-2) and (d-3) are executed.

4. A method of invoking a mobile station according to one of claims 1 to 3 in which the module includes a number of loadings counter means which is incremented by one each time the module is loaded into a mobile station and which holds the incremented count, the first non-volatile storage of the mobile station including a region where a number of loadings which is read from the module that was loaded therein during a previous pass is stored, the step (a) including the step of reading a number of loadings from the number of loadings counter means of the module which is loaded, the step (b) including the step of comparing it against the number of loadings stored in the region of the first non-volatile storage of the mobile station which stores the number of loadings plus one for coincidence, the requirements to execute the step (c) including a requirement that the numbers of loadings which are collated at step (b) coincide, the method further comprising the step of updating the number of loadings stored in the first non-volatile storage region of the mobile station by the number of the loadings which is read from the module irrespective of any result of collation which takes place at steps (a) and (b).

5. A method of invoking a mobile station according to claim 1 in which the module includes a number of loadings counter means which is incremented by one each time the module is loaded into the mobile station, and which holds the incremented count, the first non-volatile storage of the mobile station including a region in which the number of loadings which is read out from the module that was loaded during a previous pass is stored, the step (a) including the step of reading a number of loadings from the number of loadings counter means of the loaded module, the step (b) including the step of comparing it for coincidence against the number of loadings which is stored in the first non-volatile region of the mobile station plus one, the requirements to execute the step (c) including a requirement that the number of loadings collated at step (b) coincide, the communication establishing information including variable information and fixed information, and in the event the subscriber identification information coincides at step (a) while the mobile station identification information do not coincide at step (b) and the number of loadings which are collated does not coincide or in the event the mobile station identification information coincides while the number of loadings do not coincide, the method executing the following steps of;

(e-1) reading the variable information from the second non-volatile storage of the module to be overwritten on the variable information in the first non-volatile storage; and (e-2) using the mobile station identification information in the storage of the mobile station to update the mobile station identification information in the second non-volatile storage of the module and using the updated variable information in the first non-volatile storage and the fixed information which is maintained therein to set up a condition which enables a communication;

the method additionally comprising the step of updating the number of loadings stored in the region of the first non-volatile storage of the mobile station which stores the number of loadings with the number of loadings which is read out from the module for any result of collations at steps (a) and (b).

6. A method of invoking a mobile station according to claim 1 in which the module includes a number of loadings counter means which is incremented by one each time the module is loaded into the mobile station and which holds the incremented count and in which the first non-volatile storage of the mobile station includes a region in which a number of loadings which is read out from the module that was loaded therein during a previous pass is stored, the step (a) including the step of reading the number of loadings from the number of loadings counter means of the loaded module, the step (b) including the step of comparing it against the number of loadings stored in the first non-volatile region of the mobile station plus one for coincidence, the requirements to execute the step (c) including a requirement that the number of loadings collated coincide, the method executing the steps (d-1), (d-2) and (d-3) when the subscriber identification numbers coincide at step (a) while at least one of the comparison of the mobile station identification information and the collation of the number of loadings which take place at step (b) do not coincide, the method additionally comprising the step of
updating the number of loadings which is stored in the non-volatile storage region of the mobile station with the number of loadings which is read out from the module for any result of collations at steps (a) and (b).

7. A method of invoking a mobile station according to one of claims 1 to 3 in which the first non-volatile storage of the mobile station stores subscriber identification information for a plurality of subscribers and corresponding communication establishing information,
the step (a) sequentially executing the comparison of the subscriber identification information for the plurality of subscribers from the first non-volatile storage;
whenever the subscriber identification information for one of the plurality of subscribers coincides, the step (c) using the communication processing information which corresponds to the comparing subscriber identification information to set up a condition which enables a communication;
the step (d) including the steps of (d-1) using the communication processing information from the second non-volatile storage to update the communication processing information corresponding to the oldest subscriber identification information within the first non-volatile storage and (d-2) using the subscriber identification information which is read out from the storage of the module to update the oldest subscriber identification information in the first non-volatile storage.

8. A method of invoking a mobile station according to claim 7 in which the module includes a number of loadings counter means which is incremented by one each time the module is loaded into the mobile station and which holds the incremented count and in which the first non-volatile storage of the mobile station includes a region in which numbers of loadings which are read out from a plurality of modules which were previously loaded therein are stored in a manner corresponding to respective subscriber identification information, the step (a) including the step of reading a number of loadings from the number of loadings counter means of the loaded module, the step (b) including the step of comparing it against the number of loadings stored in the region of the first non-volatile storage of the mobile station in a manner corresponding to each subscriber identification information compared plus one for coincidence, the requirements to execute the step (c) including a requirement that the numbers of loadings collated at the step (b) coincide,
the method additionally comprising the step of
updating the number of loadings stored in the first non-volatile region of the mobile station where the number of loadings is stored with the number of loadings which is read out from the module for any result of collations at steps (a) and (b).

9. A method of invoking a mobile station according to claim 1 in which the module includes a number of loadings counter means which is incremented by one each time the module is loaded into the mobile station and which holds the incremented count and in which the first non-volatile storage of the mobile station includes a region in which numbers of loadings which are read out from a plurality of modules which were previously loaded therein are stored in a manner corresponding to respective subscriber identification information, the first non-volatile storage of the mobile station containing subscriber identification information for a plurality of subscribers and a corresponding communication processing information;
the step (a) including the step of reading a number of loadings from the number of loadings counter means of the loaded module and sequentially executing the comparison for the subscriber identification information for the plurality of subscribers from the first non-volatile storage;
the step (b) including the step of comparing it against the number of loadings stored in the region of the first non-volatile storage of the mobile station where the number of loadings is stored in a manner corresponding to each subscriber identification information compared plus one for coincidence;
the step (c) taking place in a manner such that if the comparison of subscriber identification information, the comparison of the mobile station identification information and the collation of the number of loadings all coincide at step (b), the communication processing information in the first non-volatile storage which corresponds to the comparing subscriber identification information is used to set up a condition which enables a communication;
the step (d) taking place such that the step (d-1) uses the communication processing information from the second non-volatile storage to update the communication processing information for the oldest subscriber identification information in the first non-volatile storage and the step (d-2) uses the subscriber identification information which is read out from the storage of the module to update the oldest subscriber identification information in the first non-volatile storage, the communication processing information including variable information and fixed information,
in the event a result of comparison at step (a) coincides while a result of collation of the number of loadings does not coincide, the method executing the steps of
(e-1) reading the variable information from the second non-volatile storage of the module to overwrite variable information in the first non-volatile storage which corresponds to the comparing subscriber identification information; and
(e-2) using the mobile station identification information in the storage of the mobile station to update the mobile station identification information in the second non-volatile storage of the module and using the updated variable information in the first non-volatile information and fixed information which is maintained therein to set up a condition which enables a communication;
the method additionally comprising the step of
updating the number of loadings stored in the region of first non-volatile storage of the mobile information in which the number of loadings is stored with the number of loadings which is read out from the module for any result of collations at steps (a) and (b).

10. A method of invoking a mobile station according to claim 1 in which the module includes a number of loadings counter means which is incremented by one each time the module is loaded into the mobile station and which holds the incremented count and in which the first non-volatile storage of the mobile station includes a region in which numbers of loadings which are read out from a plurality of modules which were previously loaded therein are stored in a manner corresponding to respective subscriber identification information, the first non-volatile storage of the mobile station storing subscriber identification information for a plurality of subscribers and a corresponding communication establishing information;

the step (a) including the step of reading a number of loadings from the number of loadings counter means of the loaded module and sequentially executing the comparison of the subscriber identification information for the plurality of subscribers in the first non-volatile storage;

the step (b) including the step of comparing it against the number of loadings, stored in the first non-volatile storage region of the mobile station in correspondence to each subscriber identification information to be compared, plus one for coincidence;

the step (c) taking place in a manner such that in the event the comparison of subscriber identification information, the comparison of the mobile station identification information and the collation of number of loadings at step (b) all coincide, the communication processing information in the first non-volatile storage which corresponds to the comparing subscriber identification information is used to set up a condition which enables a communication;

the step (d) taking place in a manner such that the step (d-1) uses the communication processing information from the second non-volatile storage to update the communication processing information in the first non-volatile storage which corresponds to the oldest subscriber identification information, the step (d-2) uses the subscriber identification information which is read out from the storage of the module to update the oldest subscriber identification information in the first non-volatile storage, and in the event the result of comparison at step (a) coincides while at least one of the comparison of the mobile station identification information and the collation of the number of loadings which take place at step (b) does not coincide, the steps (d-1), (d-2), (d-3) are executed;

the method additionally comprising the step of
updating the number of loadings stored in the first non-volatile storage region of the mobile station with the number of loadings which is read out from the module for any result of collations at steps (a) and (b).

* * * * *